Dec. 10, 1957 C. C. CROVELLA 2,816,158
METHOD FOR THE REMOTE TRANSMISSION OF INTELLIGENCE
AND PARTICULARLY OF PICTURES AND APPARATUS FOR
CARRYING OUT THAT METHOD
Filed May 18, 1953 9 Sheets-Sheet 1
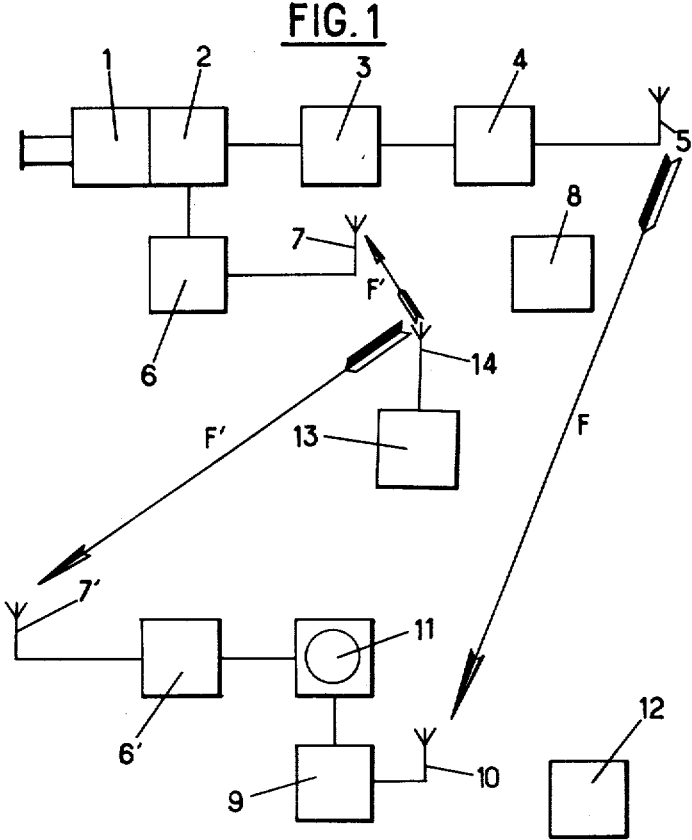
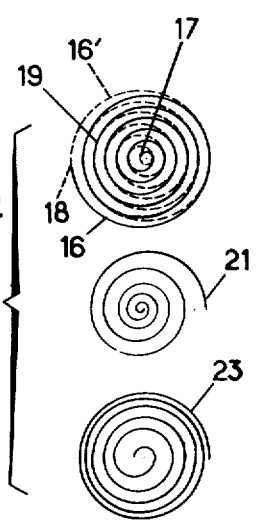
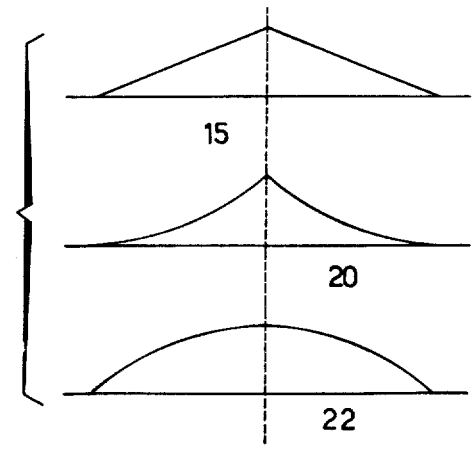

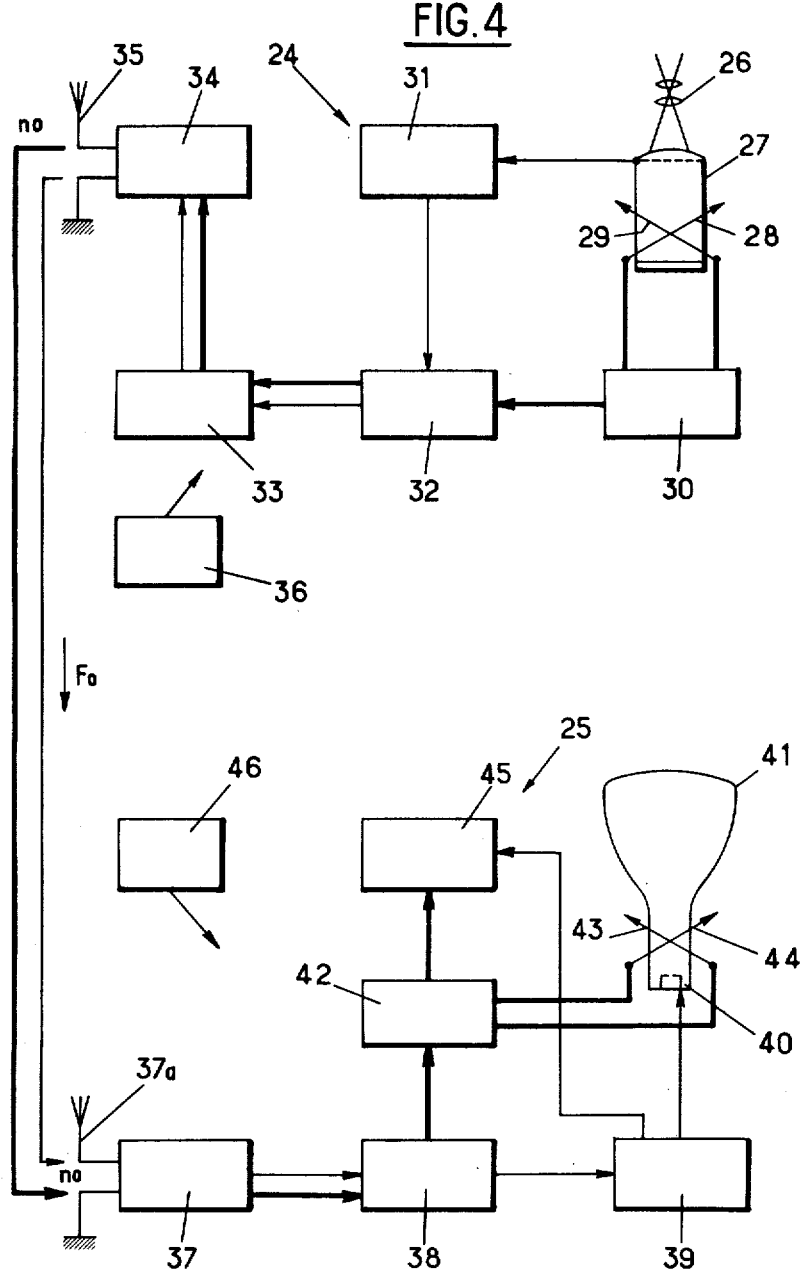

Dec. 10, 1957  C. C. CROVELLA  2,816,158
METHOD FOR THE REMOTE TRANSMISSION OF INTELLIGENCE
AND PARTICULARLY OF PICTURES AND APPARATUS FOR
CARRYING OUT THAT METHOD
Filed May 18, 1953  9 Sheets-Sheet 4

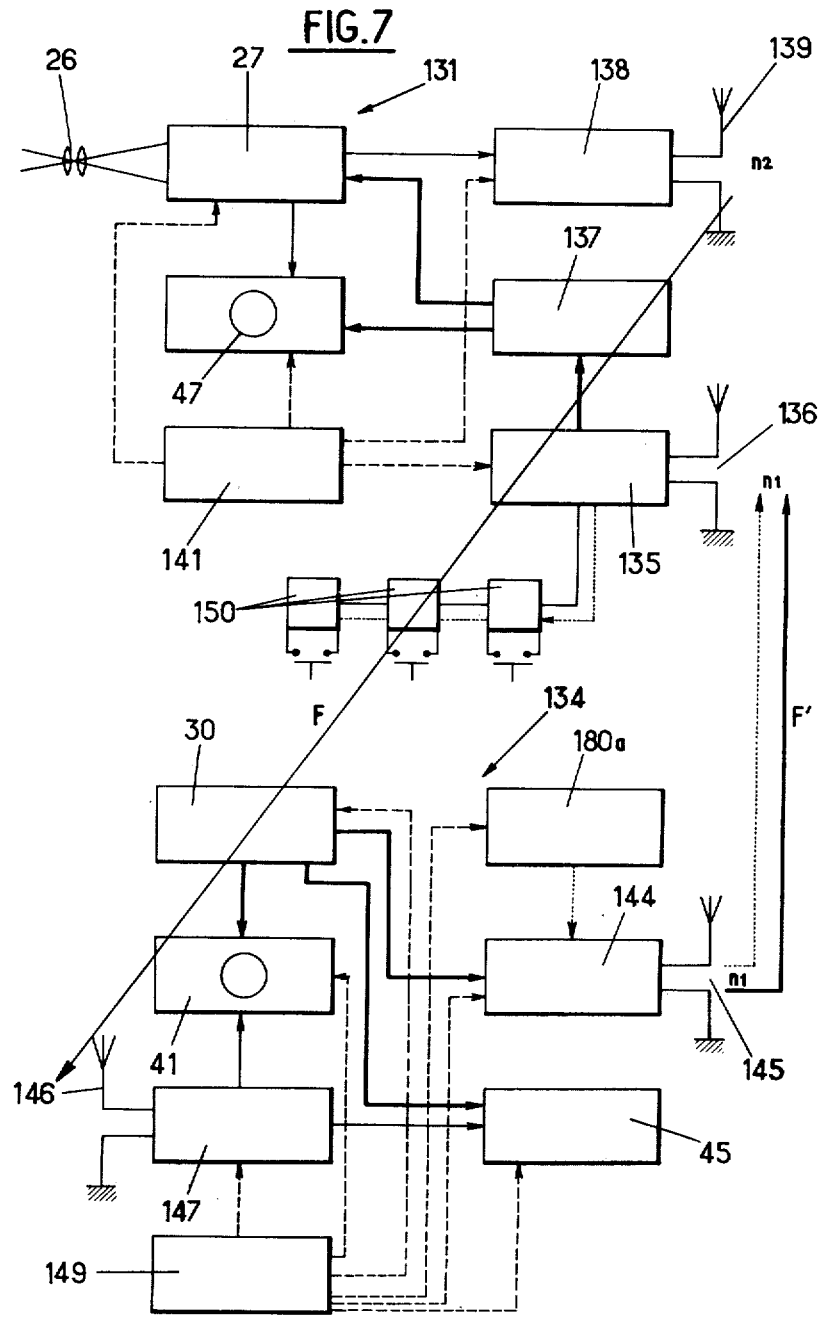

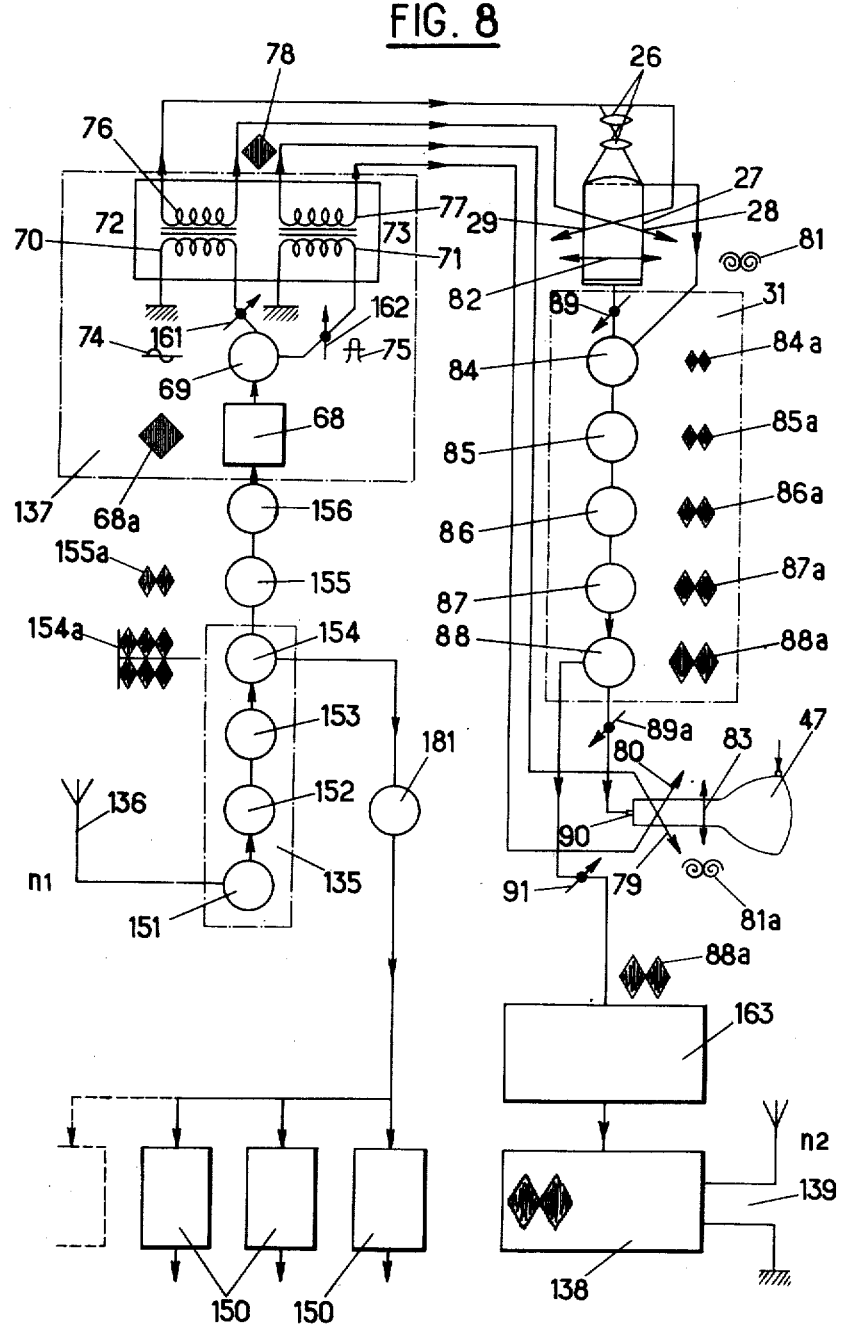

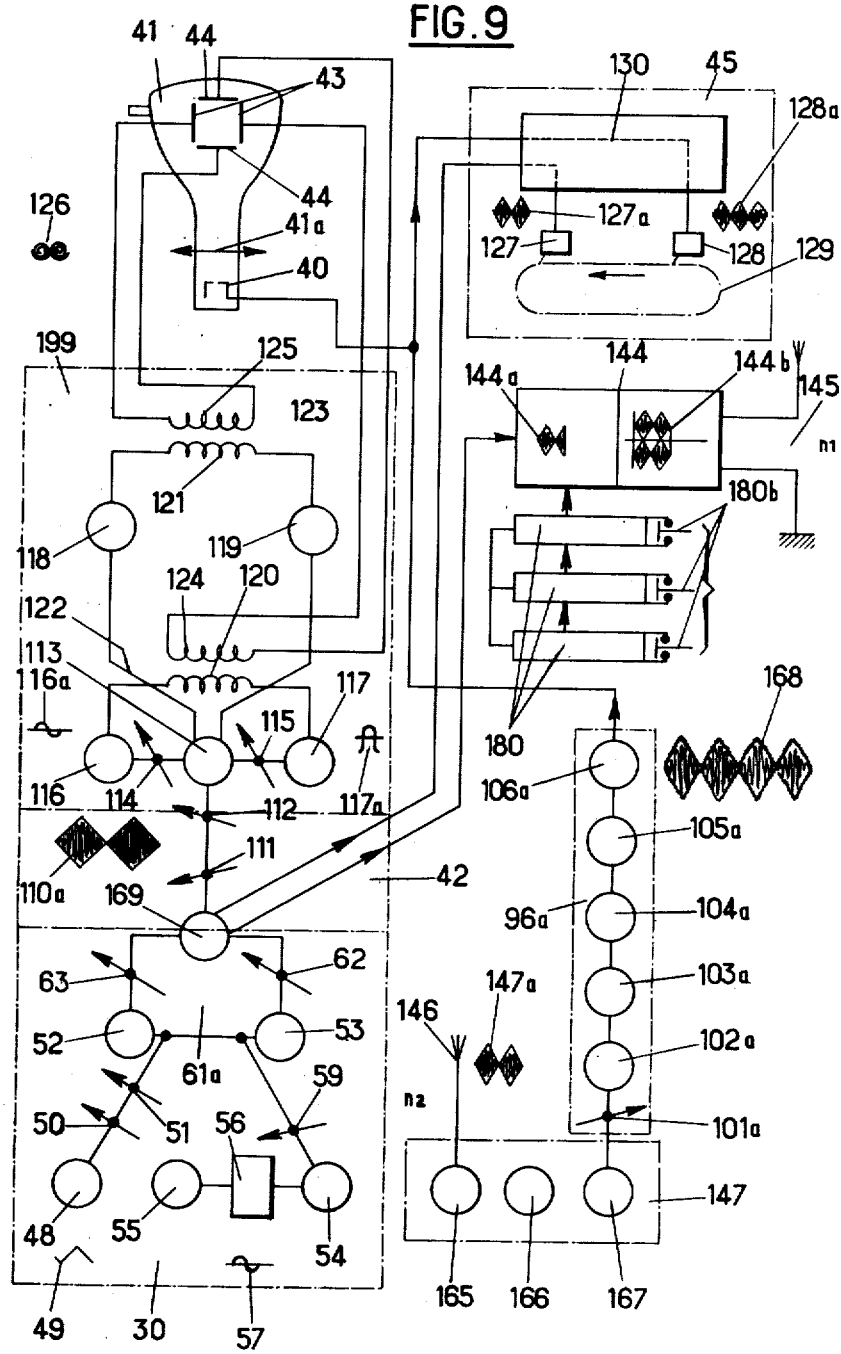

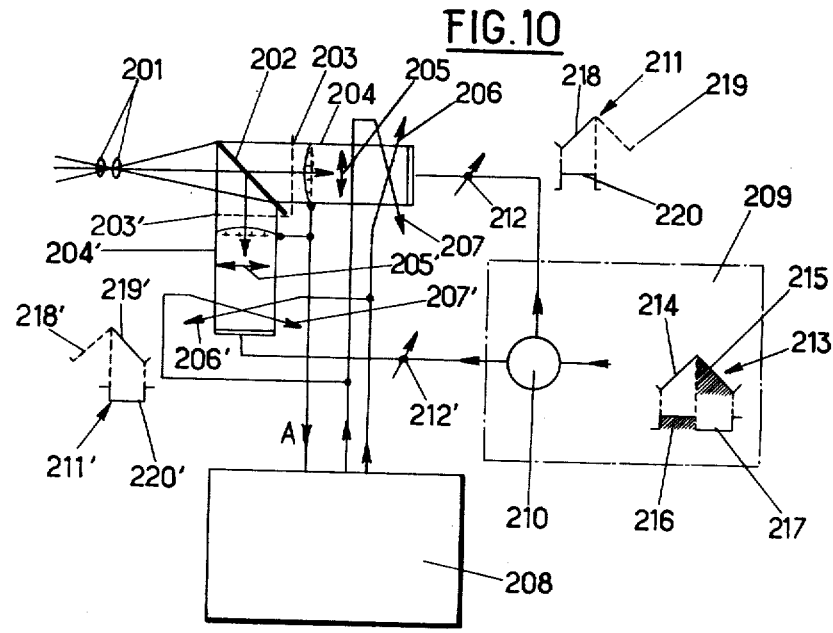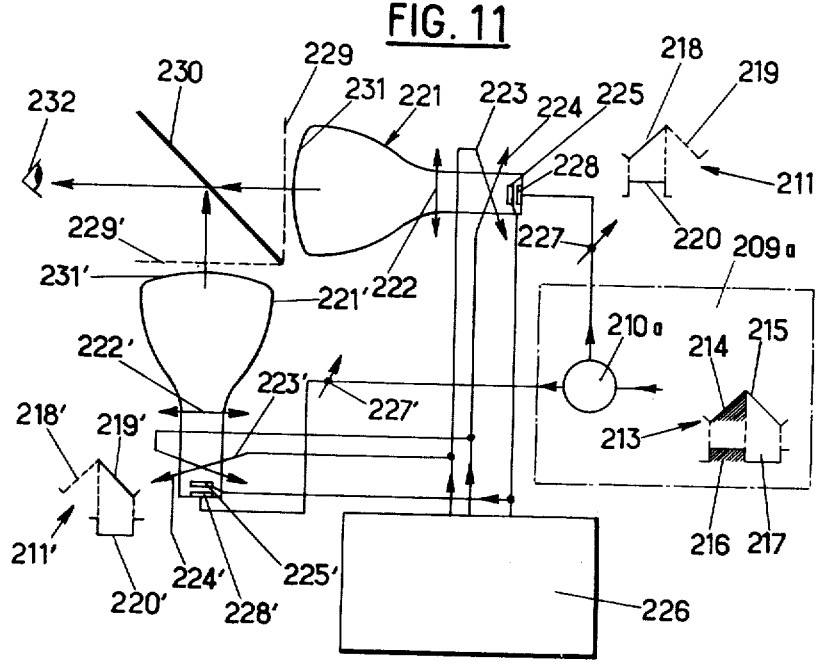

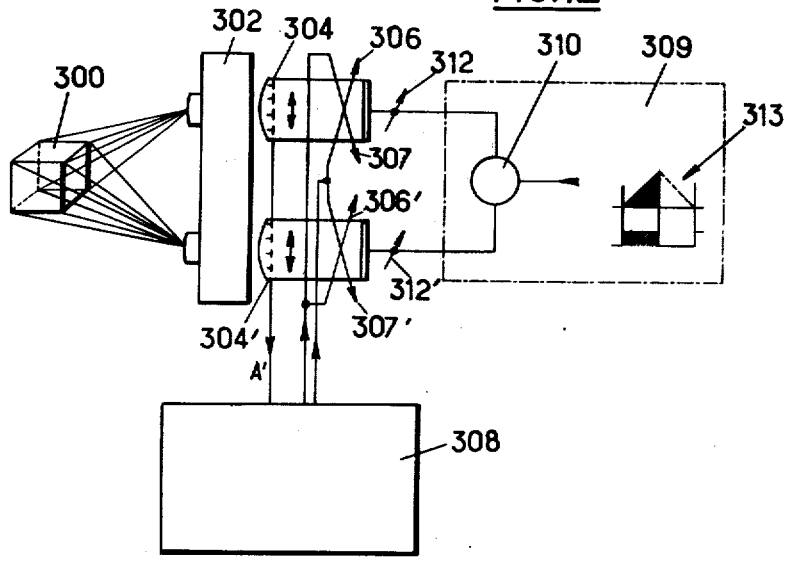
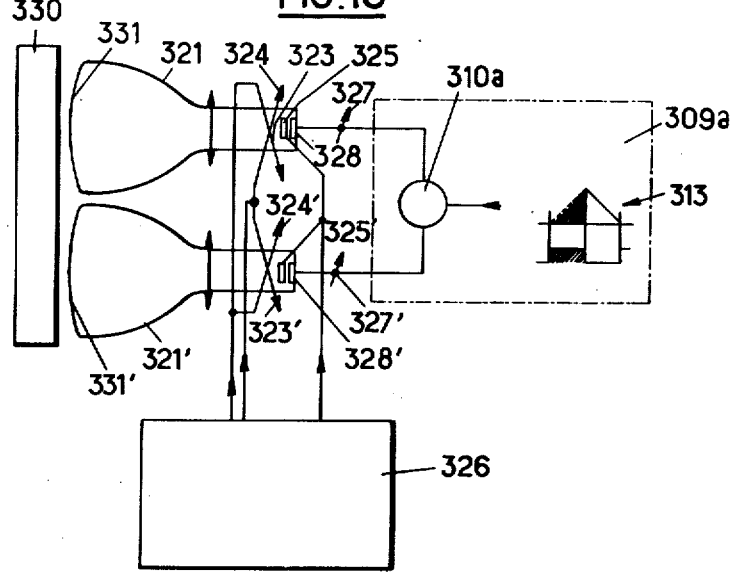

United States Patent Office 2,816,158
Patented Dec. 10, 1957

2,816,158

METHOD FOR THE REMOTE TRANSMISSION OF INTELLIGENCE AND PARTICULARLY OF PICTURES AND APPARATUS FOR CARRYING OUT THAT METHOD

Christian Charles Crovella, Paris, France, assignor to Société à Responsabilité Limitée dite Laboratoires R. Derveaux, Boulogne-Billancourt (Seine), France, a corporation of France Application May 18, 1953, Serial No. 355,721

Claims priority, application France October 29, 1952

20 Claims. (Cl. 178—5.2)

The present invention relates to a method and to apparatus for the remote transmission of visual intelligence by means of electromagnetic waves or of currents modulated to relatively low frequencies, requiring only a small power output for transmission over relatively great distances and giving an excellent quality of transmission. The method in accordance with the invention also, when necessary, allows the picture-taking equipment and the reproducing equipment to be made inter-dependent due to a remote control.

The method in accordance with the invention can be applied not only to the transmission of visual intelligence but also to the transmission of any intelligence obtained by the spot scanning of a surface or by any means which is equivalent to such scanning.

The invention is characterised essentially by a new method of scanning the surface to be explored for the purpose of the remote transmission, according to which process, there is emitted from an independent scanning emitter (which can be incorporated in the transmitter station or in the receiver) a signal which is received both of the transmitter and the receiver or receivers and which effects the scanning at the transmitter and at the receiver with automatic synchronism.

In the preferred method of carrying out the method in accordance with the invention, the scanning generator emits a sinusoidal signal one part of which is given a phase displacement of 90° by means of a phase shifting system (which exists both at the transmitter and at the receiver), the pair of signals thus obtained, namely, the initial sinusoidal signal and the displaced-phase sinusoidal signal, being applied to pairs of orthogonal plates or coils of the iconoscope of the picture producer and of the kinescope of the receiver which leads to a circular scanning, an amplitude modulation of the sinusoidal signal of the kind which will be described further on allowing an interlaced spiral scanning to be obtained.

It is an object of the invention to provide a method and apparatus for the remote transmission of pictures in which the exploration is continuous and necessitates no synchronising device.

It is another object of the invention to provide a method and apparatus for the remote transmission of pictures in which all blank periods are eliminated because of the particular shape of the scanning signal.

It is another object of the invention to provide a method and apparatus for the remote transmission of pictures allowing the intelligence signal to be modulated by 100% and to obtain, therefore, a maximum contrast, the usual saw-tooth synchronisation signals no longer occupying, as in present television methods, about 30% of the maximum amplitude of the carrier wave.

It is another object of the invention to provide a method and apparatus for the remote transmission of pictures eliminating all blank periods and giving excellent reproduction.

It is another object of the invention to provide a method and apparatus for the remote transmission of pictures allowing a narrow band-pass width to be used, which allows carrier waves of greater wave length to be used.

It is another object of the invention to provide a method and apparatus for the remote transmission of pictures having, when the nature of the picture producer allows the picture to be explored slowly, a narrow band-pass width, the video frequency and the scanning signals being adapted to be registered on magnetic elements or on films.

It is another object of the invention to provide a method and apparatus for the remote transmission of pictures allowing, during the transmission, modification at the output of the scanning emitter itself (which emitter can be incorporated in the transmitter, the receiver or anywhere else) of the definition, the frequency of repetition and the amplitude of the pictures at will, momentarily and even during the scanning.

It is another object of the invention to provide a method and apparatus for the remote transmission of pictures allowing the form of the scanning to be modified without deforming the image which is received by the receivers.

It is another object of the invention to provide a method and apparatus for the remote transmission of pictures in which any variation, even a substantial one, of factors such as the feed voltage, the frequency, fading, etc., produces only a modification of the characteristics of the picture without obliterating it or making it unintelligible.

It is another object of the invention to provide a method and apparatus for the remote transmission of pictures using greater wave lengths and, therefore, ensuring greater range than the methods and apparatus used today in television.

It is another object of the invention to provide a method and apparatus allowing pictures to be transmitted by modulation of the carrier wave by any desired method and, in particular, by amplitude, frequency, and phase modulation.

It is another object of the invention to provide a method and apparatus for the remote transmission of single-colour or multi-colour pictures.

It is another object of the invention to provide a method and apparatus for the remote transmission of pictures in relief.

It is another object of the invention to provide a method and apparatus for the remote transmission of intelligence, and particularly pictures, comprising at least one transmitter and at least one receiver which are mutually inter-dependent (the camera at the transmitter, for example, being remotely controlled by the receiver) and allowing also the transmitted intelligence to be recorded on magnetic wires or on films.

It is another object of the invention to provide a method and apparatus for the remote transmission of intelligence in which there can be superimposed on the scanning signal other signals adapted, for example, to control the camera from a distance or to transmit a code.

It is another object of the invention to provide a method and apparatus for the remote transmission of images which is easy to operate and which necessitates only a minimum number of operators.

Method for the tele-transmission of intelligence

The method in accordance with the invention will first of all be described in a diagrammatic manner and without in any way limiting the scope of the invention. The method is illustrated in Figures 1, 2 and 3 of the drawings, in which:

Figure 1 shows in block form the elements which are essential for carrying out the method.

Figure 2 represents the preferred modulation signals which are used in the method of the invention (times being plotted as abscissae and amplitudes as ordinates); and Figure 3 shows the scanning curves of the cathode ray tubes.

Figure 5:
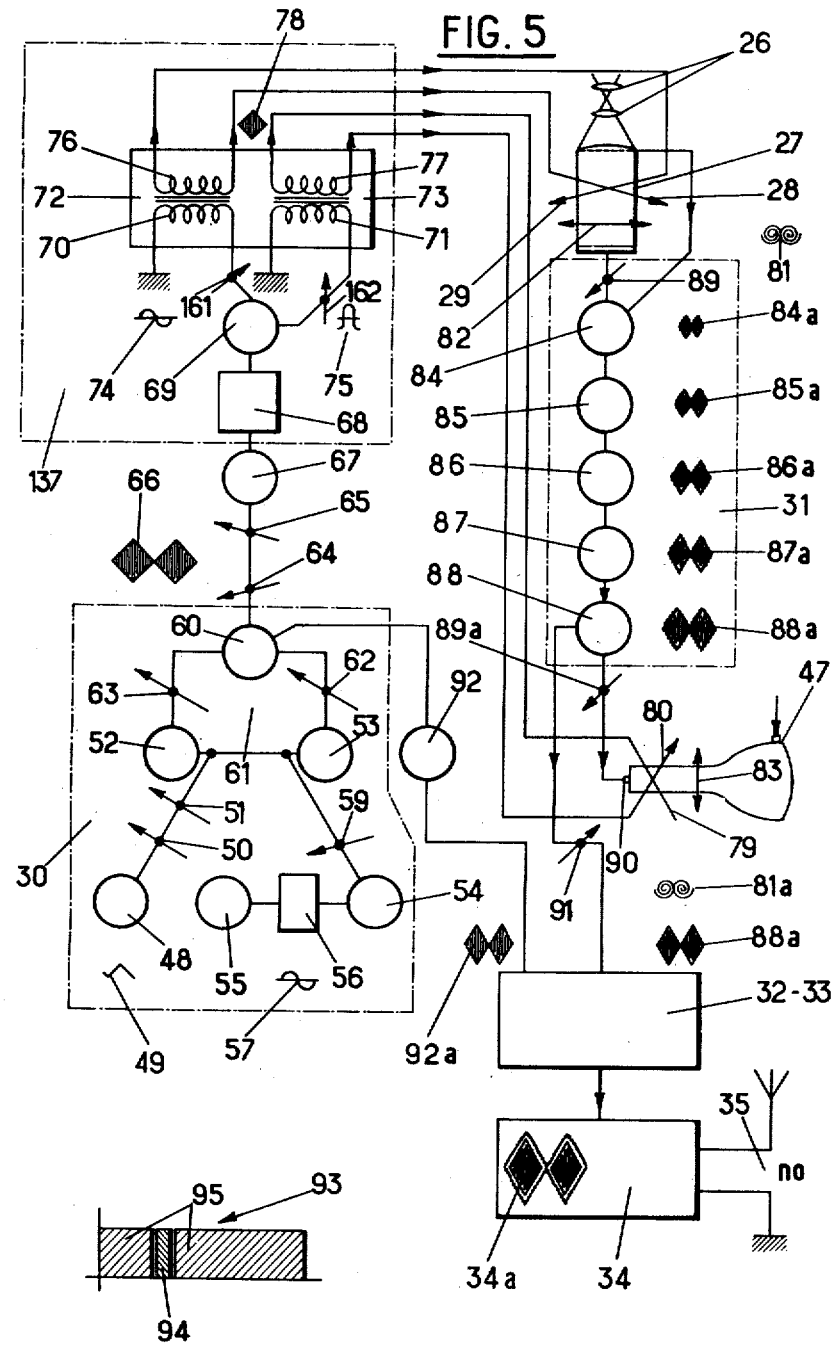

By reference first of all to Figure 1, it can be seen that the picture producing equipment comprises:

A camera 1 for taking the pictures;

An iconoscope 2 serving for the transformation of the luminous image of the camera into electrical signals;

An amplifier 3 amplifying the electrical signals leaving the iconoscope 2;

A high-frequency generator 4 the output of which is modulated by the signals leaving the amplifier 3 and is emitted through the antenna 5;

A scanning receiver-generator 6 receiving at the antenna 7 the scanning signal coming from a scanning emitter to be mentioned hereinafter and transforming that signal so as to give rise to the scanning of the iconoscope 2;

One or more sources of energy 8.

The equipment for the reproduction of the pictures comprises:

A receiver 9 receiving at an antenna 10 the signals emitted by the emitter 4 and amplifying those signals;

A kinescope 11 serving to restore the visual image;

A scanning receiver-generator 6' receiving at an antenna 7' the scanning signal coming from a scanning emitter mentioned hereinafter and transforming that signal for giving rise to the scanning of the kinescope 11;

One or more sources of energy 12.

The method of tele-transmission in accordance with the invention also involves the use of a scanning emitter 13 emitting at the antenna 14 a signal which is received by the receiver-generators 6 and 6' of the picture-taking equipment and picture-reproducing equipment; that emitter 13 can be placed in any desirable position relatively to the other equipment (it can, for example, be incorporated in the transmitter or in the receiver).

The arrow F represents the transmission of the video signals and the arrows F' the transmission of the scanning signals.

The fact that the receivers 6 and 6' are not necessarily equidistant from the scanning emitter 13 leads to a phase displacement which, most of the time, is negligible and which, moreover, can be easily corrected by introducing an adjustable delay in the receivers and having a small phase displacement reference mark on the iconoscope 2.

If the scanning emitter 13 is installed near the picture-taking device, it becomes a simple generator and the scanning signal is transmitted to the equipments for reproducing the images through the same channel as the image signal.

On the other hand, when it is a question of submitting the picture-taking station to a remote control from the receiving station, it can be advantageous to incorporate the scanning emitter 13 in the receiving station.

It will be seen that the signals which are necessary for the scanning of the iconoscope 2 and of the kinescope 11 are emitted by one and the same auxiliary emitter 13 and do not have to be otherwise synchronised, because they are strictly identical in time, except for the above-mentioned phase displacement, in the two equipments. That is one of the essential featuers of the present invention.

Another characteristic feature of the invention is the choice of the scanning signal which is used. That signal is a simple sinusoidal wave emitted by the auxiliary scanning emitter 13. That wave is received in the receivers 6 and 6', a phase shifting system allowing a part of the signal to have its phase displaced through 90°. The pair of signals formed by the initial sinusoidal wave and the phase displaced sinusoidal wave is applied to the two pairs of deflecting plates or coils of the iconoscope 2 and of the kinescope 11 and allows a circular scanning of those cathode ray tubes to be obtained. By suitably modulating the amplitude of the sinusoidal signal, a spiral scanning can be obtained.

In particular, if the sinusoidal signal is modulated by a double signal such as a triangular signal of the type 15 (Figure 2) and by the mirror image thereof on the opposite side of the axis of the abscissae, a regular spiral 16 is obtained the lines of which are susbtantially equidistant and which increases first of all from the centre 17 towards the outside 18 and then come back (spiral 16') towards the centre and so on. Two spirals 16, 16' are thus obtained which turn in opposite senses and intersect at numerous points such as the points 19 (Figure 3).

The "return" scanning (spiral 16') gives a complete image as does the "forward" scanning (spiral 16). If then the sinusoidal signal is modulated, for example, by means of twenty-five signals of the shape 15, fifty half-images will be obtained per second (interlaced spiral scanning). However, as the images which are produced by the "return" scanning are not superimposed on the images coming from the "forward" scanning, the definition of the image is improved.

If the ratio of the frequency of the triangular signal 15 and that of the sinusoidal wave which is modulated by that signal is a whole number, the two spirals 16 and 16' are at rest one relatively to the other; the quality of the image in that case may not be perfect, a spiral "track" being visible. On the other hand, if that ratio is not a whole number, the spirals 16 and 16' will turn one relatively to the other which allows an image of excellent quality to be obtained.

There are present, therefore, two parameters (two frequencies) by means of which one can obtain an infinity of different kinds of scanning.

Furthermore, instead of a triangular signal 15, one can use, without thereby exceeding the scope of the invention, symmetrical modulating signals of the kind of that shown at 20 (Figure 2), which allows "return" and "forward" spirals to be obtained (only the forward spiral 21 has been shown in Figure 3) which are much more tight at the centre than at the periphery. Signals of the type 22 on the other hand, allow spirals which are less tight at the centre than at the periphery to be obtained (the spiral 23 for "forward" scanning is shown).

In Figure 2, times have been plotted as abscissae and amplitude as ordinates, the axis of symmetry of the signals 15, 20 and 22 being shown in broken lines.

One can also, without exceeding the scope of the invention, use asymmetrical signals when special effects are to be obtained.

The use of a sinusoidal signal modulated by a double signal constituted by the triangular signal 15 and its mirror image leads, after phase displacement and application of the two phase-displaced waves to the pairs of opposite plates of a cathode ray tube, to spirals 16, 16' which are traversed at a constant angular speed and, therefore, at a linear speed which is much smaller at the centre 17 than at the periphery 18. Such a scanning can be used without modification, the above-mentioned phenomenon being advantage in the case in which the centre of the image is of greater interest than its marginal portions. In this way one obtains at the centre 17 both a greater illumination and a better definition.

That difference in illumination, by acting on the wehnelt of the kinescope 11 can be compensated, for example by modulating the latter by means of the same triangular signal 15 as that which modulates the sinusoidal scanning signal. The illumination is thus corrected at the expense of a loss of mean illumination but the definition remains better at the centre 17 than at the periphery 18.

The frequency of the sinusoidal wave can also be modified so as to traverse the spiral at a constant linear speed, which corrects both the illumination and the definition.

Indeed, without departing from the general idea underlying the invention, the sinusoidal wave can be modulated in any known manner.

The method in accordance with the invention can be applied also very easily to colour television. For two-colour television, two iconoscopes are provided at the transmitter and are provided with appropriate filters and are connected successively by means of a suitable switch (for example, an electronic switch) controlled by the rise and then the fall of the triangular signal which modulates the sinusoidal scanning wave.

At the receiving station, two special kinescopes are provided working on a known principle and allowing the two images which are received in succession to be superimposed through the medium of a switching process of the same kind as that effected at the transmitter. In this way, if the switching rate is sufficiently high, one obtains a satisfactory two-colour image. The band-pass width remains the same as for a black and white transmission (for the same definition of the image) whereas the known colour television methods necessitate a band-pass of almost twice the width (in the case of two-colour operation).

By the alternating of three, four or more iconoscopes and kinescopes, one can obtain three, four or any other number of colours.

By modifying the two-colour method which has just been set out in order to apply it to two iconoscopes provided with an optical stereoscopic device and to two kinescopes provided with a similar optical device, one can obtain relief images or even effect telemetric measurements.

If the nature of the picture-taking equipment is such as to allow the image to be explored slowly, the band-pass for the signal which is necessary for the transmission of that image can be narrow and the video frequency and the scanning signal can be recorded on a magnetic wire or on film. That possibility is a very big advantage of the process in accordance with the invention because such recording is not possible with the methods of television which require the use of synchronisation impulses.

*Apparatus for the remote transmission of intelligence*

The apparatus for the remote transmission of intelligence, and particularly of pictures, in accordance with the process which has just been described is characterised by the fact that it comprises essentially a generator of sinusoidal signals and of signals for modulating those signals, an emitter of such modulated sinusoidal signals which constitute the scanning signals; a transmitting station comprising a television camera, means for ensuring the emission of scanning signals transmitted from the above-mentioned generator to the elements for deflecting the beam of electrons from that camera and a video and, if desired, audio signal emitter; at least one receiving station comprising a kinescope, means for ensuring the emission of the scanning signals transmitted from the above-mentioned generator to the elements for deflecting the beam of electrons from the said kinescope, a receiver for the video and, if appropriate, audio signals emitted by the emitting station.

In a first form of construction, the generator for the sinusoidal signals and for the modulating signals is arranged at the transmitter which sends out at the same time the video signals, the scanning signals and, if desired, the audio signals.

In a second form of construction, the generator and the emitter of the scanning signals are arranged at the receiver and the transmitting station comprising a receiver which receives the scanning signals emitted by the receiving station.

More specifically, the generator of the scanning signals comprises a transitron, which emits a symmetrical signal which first of all increases and then decreases, for example, a triangular signal, and an oscillator giving rise to a sinusoidal signal, the symmetrical signal and its negative image modulating the sinusoidal signal in order to produce the scanning signal; the scanning signal which is made up of a sinusoidal signal which is amplitude modulated by a double symmetrical signal (original signal and its negative image) is divided into a pair of signals having a relative phase displacement of 90°, each of the signals of this pair being applied to a pair of plates or of coils of the iconoscope and of the kinescope or kinescopes.

In one particular form of construction, the receiver comprises remote control frequency modulators, a generator for the scanning signals, a mixer-emitter which mixes the scanning signals and the remote control signals and which emits them on a carrier wave, a phase shift system which transforms the above-mentioned scanning signals into a pair of scanning signals having a relative phase displacement of 90°, a video signal receiver adapted, if desired, to receive also audio signals, an amplifier for the video signals and, if appropriate, for the audio signals, a kinescope the wehnelt of which receives the video signals and the pairs of orthogonal plates or coils of which receive the pair of scanning signals having a relative phase displacement of 90°, while the transmitting station comprises a receiver for the scanning signals and for the remote control signals which are emitted from a receiving station, a separating device for separating the remote control signals from the scanning signals, a phase shift device which transforms the scanning signals into a pair of signals having a relative phase displacement of 90°, an iconoscope the two pairs of orthogonal plates and coils of which receive the pair of scanning signals having a relative phase displacement of 90°, a video amplifier, a video emitter and a device receiving the remote control signals which are filtered by the said separating device and transforming those signals into remote control orders.

An image receiving device, in accordance with the invention, can also comprise a recording device comprising an amplifier, a recording and reproducing head for the video signals, a recording and reproducing head for the scanning signals and a record element, for example, a magnetic wire, the reproduction of the recording being effected with a high definition by rapidly unwinding the record element before the recording and reproducing heads.

Various possibilities of carrying the invention into effect will now be described by way of illustration and without in any way restricting the scope of the invention with reference to the accompanying drawing in which:

Figure 4 shows in block diagrammatic form, a first form of apparatus for the transmission of images in accordance with the invention, in which the scanning emitter is arranged at the receiver.

Figure 5 shows diagrammatically the picture-taking equipment in accordance with that first form.

Figure 6:
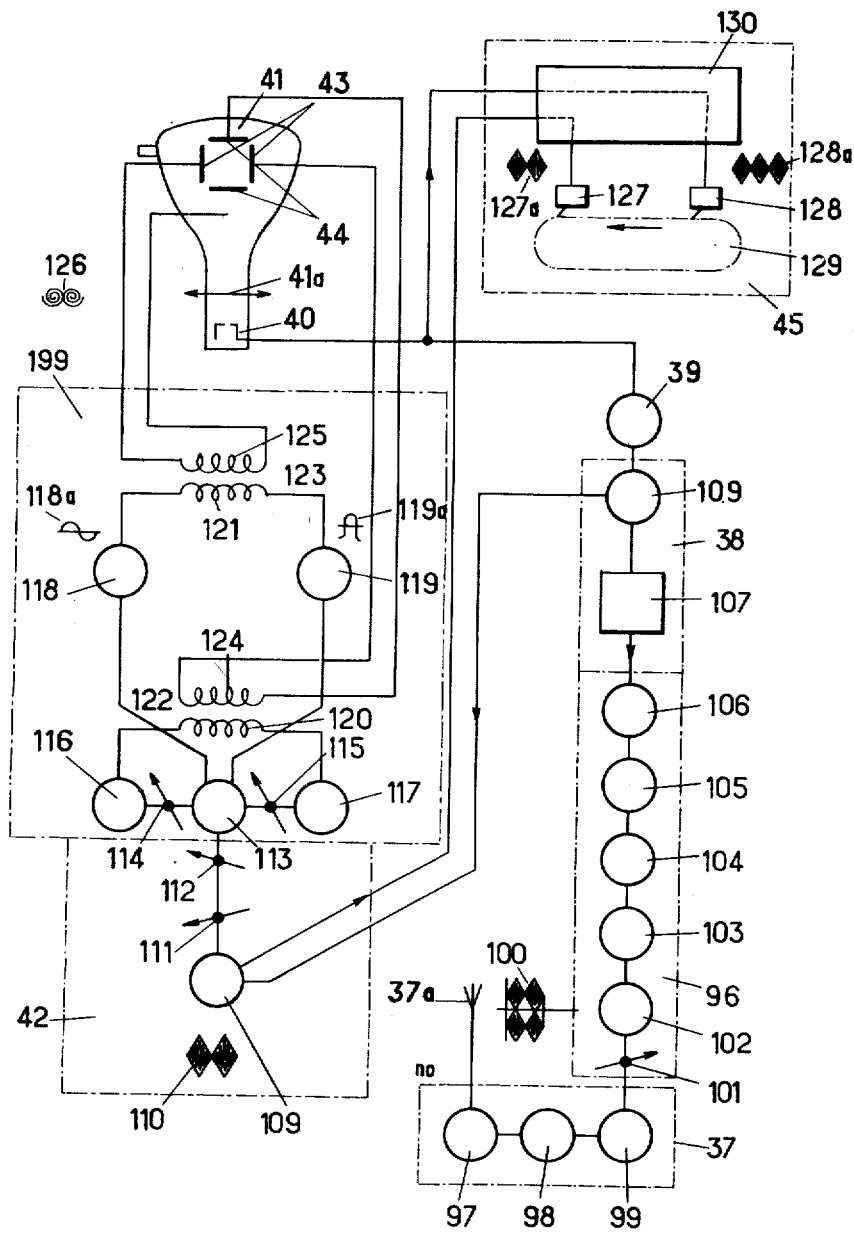

Figure 6 shows the reproducing and recording apparatus in that first form.

Figure 7 shows, in the form of diagrammatic blocks, a second form of apparatus in accordance with the invention, in which the scanning emitter is incorporated in the receiving station which controls the picture taking apparatus.

Figure 8 shows diagrammatically the picture taking equipment in this second form.

Figure 9 shows the picture reproducing and recording equipment in this second form.

Figure 10 shows a two-colour picture taking device for use in the remote transmission of colour pictures.

Figure 11 shows a two-colour receiver.

Figure 12 shows an apparatus for taking stereoscopic relief pictures.

Figure 13 shows a device for the reproduction of stereoscopic pictures emitted by the apparatus of Figure 12.

In the following description no mention will be made of the transmission of the audio signals which is effected in the usual manner.

*Form of construction with the scanning emitter in the transmitting station*

This first form of construction is shown in Figures 4, 5 and 6, and can be assumed for example, to be a station emitting a programme which can be received by any number of receiving stations.

Referring first of all to Figure 4 in which, in the form of diagrammatic blocks, there has been shown the transmitter 24 and a receiver 25, it will be seen that the image is constrained to pass through an objective 26 and is transformed into an electronic image by an iconoscope 27 the scanning of which by the horizontal and vertical deflection plates 28 and 29 is ensured by a scanning generator 30. The amplification of the electronic image is ensured by an amplifier 31. The image signals (in thin lines) coming from the amplifier 31 and the scanning signals (in thick lines) coming from the generator 30 are mixed in a mixer 32; the mixed video and scanning signals are then transmitted to a modulator 33 and thence they go to the emitter 34 whence they are emitted by the antenna 35 on a carrier frequency $n_0$. The picture taking device is fed by a source of current 36.

The image and scanning signals which proceed in accordance with the arrow $F_0$ are received by the antenna 37a of the receiver 37 at the station 25 together with the frequency $n_0$ and they are separated by the separating filter 38. The image signals (in thin lines) are applied to the video amplifier 39 and modulate the cathode or the wehnelt 40 of the kinescope 41. The scanning signals (in thick lines) are applied to the scanning amplifier 42 and effect the analysis of the kinescope 41 by being applied to the horizontal and vertical deflection plates 43 and 44. The scanning signals, when amplified in 42, also arrive at the recorder 45 which also receives the image signals coming from the video amplifier 39. Such a recorder 45 may exist in only some of the receiving stations.

The receiving station 25 as a whole is fed by a source of energy 46.

In Figure 5 has been shown diagrammatically the picture taking equipment 24 of Figure 4 which comprises a scanning signal generator 30, a phase shift device 137, an iconoscope 27, a video amplifier 31, and if desired a control kinescope 47, a mixer-modulator 32, 33 an emitter 34 for the video and scanning signals (with an emitting antenna 35) and finally, a source of energy not shown.

The scanning signal generator 30 comprises a transitron 48 which gives a symmetrical signal, for example the triangular signal 49 (corresponding to the signal 15 of Figure 2); the isoceles triangles 49 are obtained in the transitron by integration, in the known manner, of alternately positive and negative rectangular signals. The potentiometer 50 and the potentiometer 51 act, respectively, on the frequency and on the amplitude of the signal 49 which is then applied to the grids of the tubes 52 and 53. The generator 30 also includes an oscillator formed by the tubes 54 and 55 and the tuned circuit 56 and which gives rise to a sinusoidal wave 57 the amplitude of which is adjusted by means of the potentiometer 59; the sinusoidal signal 57 is applied to the cathodes of the tubes 52 and 53. The assembly constituted by the tubes 52, 53 and 60 forms a mixer-modulator 61 the potentiometers 62 and 63 of which regulate the phase and the depth of the modulation. The amplitude and the phase displacement of the signal 66 leaving the mixer-modulator 61 are adjusted respectively by the potentiometers 64 and 65. That signal 66, resulting from the modulation of the signal 57 by the signal 49 and by the negative mirror image thereof (the signal 49 is applied to the two tubes 52 and 53.) is formed of sinusoidal waves the envelope of which is constituted by a series of rhombi.

The tube 67 is a pre-amplifier the output of which is connected in a phase shifting circuit 68. The tube 69 is a double triode amplifier having two outlets acting on the primaries 70 and 71 of the transformers 72 and 73 respectively. The primaries 70 and 71 have one of their terminals grounded and they receive the two 90° out of phase, sinusoidal signals 74 and 75. The potentiometers 161 and 162 serve to adjust the amplitudes of the signals 74 and 75.

In the secondaries 76 and 77 of the transformers 72 and 73 appear the amplified signals 78 which are applied to the orthogonal deflection plates 28 and 29 of the iconoscope 27 and to the orthogonal plates 79 and 80 of the conrtol kinescope 47, thus ensuring the interlaced spiral scanning 81 and 81a (those plates can obviously be replaced by coils in the case of electromagnetic deflection).

The image to be transmitted is analysed by the iconoscope 27 through the objective 26 and the electronic beam is concentrated by the element 82. The two sinusoidal scanning signals, that is to say, the sinusoidal signal the phase of which has not been modified and that of which the phase has been displaced through 90°, lead to a double, interlaced spiral scanning; the sinusoidal signal 57 modulated by the signal 49 gives a spiral scanning 81 (the two spirals have here been shown side by side for the sake of clearness) of the iconoscope 27.

The image signals produced by the iconoscope 27 are amplified in the video amplifier 31 which comprises pre-amplifier tubes 84 and 85, amplifier tubes 86 and 87 and a double cathodyne 88 with two outlets. Opposite each tube 84, 85, 86, 87 and 88 have been shown the corresponding image signals 84a, 85a, 86a, 87a and 88a.

A rheostat 89 also serves to adjust the amplitude of the signals. One of the outputs from the tube 88 is applied across the rheostat 89a to the cathode or to the wehnelt 90 of the control kinescope 47. The cathode beam of the kinescope 47 is deflected by the plates (or coils) 79 and 80 by being subjected to a double interlaced spiral scanning 81a (the two spirals have been shown side by side) and is concentrated by the focusing element 83. (That element 83, like the element 82, is formed in the known manner of electronic, electrostatic, or electromagnetic lenses.)

The second output of the tube 88 is applied across the rheostat 91 on the mixer-modulator 32, 33 which also receives through the tube 92 the scanning signal of the type 66 coming from the tube 60.

Above the mixer-modulator 32, 33 have been shown two signals which enter it, that is to say, the scanning signals 92a coming from the tube 92 and the video signals 88a coming from the tube 88. The mixed video and scanning signals 34a are sent from the modulator 32, 33 to the emitter 34 which, through the antenna 35, emits on a carrier frequency $n_0$, the complex signal 93 (shown in the lower left hand corner of Figure 5) comprising the scanning signals 94 interposed between the video signals 95.

In Figure 6 there has been shown a receiving station (the station 25 of Figure 4) comprising essentially a receiver 37 having an antenna 37a, an amplifier 96 for the mixed signals, a filter 38, a video amplifier 39, an iconoscope 41, an amplifier 42 for the scanning signals, a phase shift device 199 and, if desired, a recorder 45.

The image and scanning signals emitted by the antenna 35 on the carrier frequency $n_0$ are received by the antenna 37a of the receiver 37 comprising, for example, a high frequency tube 97, an oscillator tube 98 and a frequency changing tube 99.

The complex signals 100 leaving the receiver 37 are amplified in the amplifier 96 comprising a rheostat 101, pre-amplifier tubes 102, 103 and amplifier tubes 104, 105 and 106. The signals leaving the amplifier 96 arrive in a filter 107 in which the image signals are selectively separated from the scanning signals. The tube 108 has two outlets of which one transmits the image signals to the tube 39 serving as an image amplifier and thence to the wehnelt 40 of the kinescope 41 and the other sends the scanning signals to the tube 109.

The amplitude of the scanning signals 110 leaving the pre-amplifier tube 109 is adjusted by the potentiometers 111 and 112 before arriving in a double triode de-phasing tube 113. The potentiometers 114 and 115 act on the phase displacement of 90° which it is desired to obtain between the two sinusoidal signals which will be applied to the pairs of plates or coils 43 and 44 of the kinescope 41. The tubes 116, 117, 118 and 119 are amplifiers. One cathode of the double triode de-phasing tube 113 controls the grid of the tube 116 and the second, the tube 117. The first and second plates of the double triode 113 control respectively, the tubes 118 and 119. At 118a and 119a are shown the signals which have been subjected to a phase displacement of 90° leaving the tubes 118 and 119. The plates of the amplifier tubes 116, 117 and 118, 119 are arranged in the primaries 120 and 121 of the transformers 122 and 123 respectively. The ratios of the transformers 122 and 123 are calculated so as to give an amplitude to the secondaries 124 and 125 which is sufficiently great to ensure symmetrical scanning of the orthogonal deflection plates or coils 43 and 44 of the kinescope 41. The scanning is a double inter-laced spiral scanning shown at 126 (the two spirals have been shown side by side for the sake of clearness). The element 41a concentrates the electrons beam from the wehnelt 40.

From the pre-amplifier tube 109 scanning signals 110 are taken and are sent to the recorder 45. The latter also receives video signals coming from the tube 39. The recorder comprises an amplifier 130 disposed in front of the recording and reproducing heads 127 and 128, the head 127 allowing the recording and the reproduction of the scanning signals 127a and the head 128 allowing the recording and the reproductiong of the video signals 128a. The recording takes place on the record 129. The video signals 128a and the scanning signals 127a are recorded for example, on a magnetic wire 129 of low definition, the high definition reproduction by the head 128 and 127 being ensured by subsequent rapid unwinding of the magnetic wire 129.

*Form of construction with the scanning emitter in the receiving station*

The second form of construction in which the scanning emitter is incorporated in the image reproducing equipment and, if desired, in the picture recording equipment, is particularly suitable when it is desired that the picture taking device be remote controlled from the picture reproducing device. Thus, for example, from a fixed station (the picture reproducing station) one can control the direction of the camera, and if desired, the displacement of the picture taking equipment as a whole.

Figures 7, 8 and 9 have been given the same reference numerals as Figs. 4, 5 and 6.

Referring first of all to Figure 7, it can be seen that in the picture taking equipment 131, the image which is received through an objective 26 is transformed into an electronic image and is amplified by the camera 27, as in the first form of construction. The scanning of the camera 27 is controlled from the image receiving or reproducing station 134 which emits the scanning signals on a carrier frequency $n_1$. The latter is received in the apparatus 131 by the receiver 135 through the antenna 136. These scanning signals have their phase displaced by the de-phasing device 137 and are then sent into the camera 27 for ensuring the scanning of the latter. The image formed by the camera 27 sends the corresponding electrical signals, after amplification, into the image emitter 138 which emits on a carrier frequency $n_2$ through the antenna 139, and also to a control kinescope 47 which receives also the scanning signals from the de-phasing device 137. A source of energy 141 feeds the picture taking apparatus as a whole.

The picture receiving apparatus 134 comprises a scanning generator 30 which sends its signals to the kinescope 141 and into the scanning emitter 144 which emits the scanning signals through the antenna 145 on the carrier frequency $n_1$ (these signals are sent out as shown by the arrow F' and are received by the antenna 136 of the apparatus 131).

The image signals emitted on the carrier frequency $n_2$ by the antenna 139 and proceeding as indicated by the arrow F are received by the antenna 146 of the image receiver 147 which sends them to the kinescope 41.

If desired, the images can be recorded in a recorder 45 receiving both the scanning signals from the scanning generator 30 and the image signals from the receiver 147. A source of energy 149 feeds the receiving apparatus 134.

The device which has just been described is particularly suitable when it is desired also to send tele-control signals from the picture reproducing apparatus 134. In that case, a tele-control frequency modulator 180a is provided which sends tele-control signals to the emitter 144, these signals being also emitted by the antenna 145 on the carrier wave $n_1$. In that case, the receiving station 131 comprises filters separating the scanning signals which are to be sent out as indicated previously to the de-phasing unit 137, from the modulating frequencies which are to be sent to the modulation frequency filters 150.

In Figure 7, the transmissions of the scanning signals has been indicated in thick lines, the transmission of the video signals in thinner lines, the transmission of the energy required for the operation of the various elements in broken lines and the transmission of the tele-control signals dotted.

The second method of construction will now be described in greater detail with reference to Figures 8 and 9 showing respectively the equipment at the transmitting station 131 and at the receiving station 134.

The scanning signals are emitted in the second form of construction by the receiving station of Figure 9 in which, for creating the scanning signals, there is provided a scanning emitter 30 analogous to that of Figure 5 and which will be described hereinafter with reference to Figure 9. The signals 144a from the generator 30 arrive in the emitter 144 which emits them through the antenna 145 on the carrier frequency $n_1$.

Referring now to Figure 8 it will be seen that the scanning signals from the iconoscope 27 in the receiving station are received by the antenna 36 on the carrier frequency $n_1$. They are received by a selective receiver 135 constituted by the amplifier tubes 151, 152, 153 and 154; they are then detected by the tube 155.

It will be seen later on that one can also, on the carrier frequency $n_1$, emit from the receiving station tele-control signals. The valve 154 then serves to separate such signals from the scanning signals, the former signals having frequencies which are substantially different from that of the latter. The scanning signals and control signals are shown before separation, at 154a and, after leaving the tube 155, the scanning signals at 155a.

The signals 155a are pre-amplified by the tube 156 and then arrive in the de-phasing unit 137. The signals 68a are first treated by the tuned circuit 68 and then amplified in the tube 69 through the transformers 72 and 73, the potentiometers 161 and 162 serving to adjust the amplitudes of the scanning signals 74 and 75 the phase of which has been displaced.

The amplified and phase displaced signals 78 which are applied to the deflection plates 28 and 29 of the iconoscope 27 and to the orthogonal plates 79 and 80 of the control kinescope 47 appear in the secondaries 76 and 77 of the transformers 72 and 73.

The image to be transmitted is analysed by the iconoscope 27 through the objective 26 and the electron beam is concentrated by the focusing element 82 constituted by electronic, electrostatic or electromagnetic lenses.

The two scanning sinusoidal signals 74 and 75, that is to say, the signal which has not been subjected to phase displacement and that which has been subjected to a phase displacement of 90°, form a double interlaced spiral 81 (the two spirals have been shown side by side for the sake of clearness).

The image signals created by the iconoscope 27 are amplified in the video amplifier 31 analogous to the amplifier 31 of Figure 5 and which comprises pre-amplifier tubes 84 and 85, amplifier tubes 86 and 87 and a double cathodyne 88 with two outputs. Opposite each tube 84, 85, 86, 87 and 88 have been shown the image signals 84a, 85a, 86a, 87a and 88a corresponding thereto. A rheostat 89 also serves to adjust the amplitude of the signals.

One of the outputs of the lamp 88 is connected across the rheostat 89a to the cathode or to the wehnelt 90 of the control kinescope 47. The cathode beam coming from 90 is deflected by the plates or coils 79 and 80 by being subjected to a double spiral scanning 81a, analogous to the spiral scanning 81 of the iconoscope 27 and is concentrated by the element 83 formed of electronic, electrostatic or electromagnetic lenses.

The second output from the tube 88 is applied across a rheostat 91 to the modulator 163 (signal 88a) which modulates the emitter 138 which emits the video signal through the antenna 139 on the carrier frequency $n_2$.

Referring now to Figure 9 in which has been shown a receiving station comprising essentially a receiver 147 having an antenna 146, a video amplifier 96a, an iconoscope 41, a scanning signal generator 30, an amplifier 42 for the scanning signals, an emitter 144 for the scanning signals having an antenna 145 and, if desired, a recording head 45.

The image signals emitted by the antenna 139 (Figure 8) on the carrier frequency $n_2$ are received by the antenna 146 of the receiver 147 comprising for example, a high frequency tube 165, an oscillator 166 and a frequency changing tube 167. The signals 147a leaving the receiver 147 are amplified by the amplifier 96a comprising a rheostat 101a, pre-amplifier tubes 102a and 103a and amplifier tubes 104a, 105a and 106a. The image signals 168 leaving 106a are sent to the wehnelt 40 of the iconoscope 41 and into the recorder 45 if the receiving station comprises such a recorder.

The signals scanning the kinescope 41 at the receiving station and also the iconoscope 27 and the kinescope 47 at the transmitting station (Figure 8) are produced by a scanning generator 30 analogous to the generator 30 of Figure 5. That generator comprises a transitron 48, giving rise to a triangular signal 49 and an oscillator constituted by the tubes 54 and 55 and the tuned circuit 56 and giving rise to a sinusoidal signal 57. The symmetrical triangular signal 49 formed by the transitron 48 is applied across the potentiometer 50 regulating the frequency and the potentiometer 51 regulating the amplitude on the grids of the tubes 52 and 53. The sinusoidal signal 57 of higher frequency which is formed by the oscillator 54, 55, 56 is applied across the potentiometer 59 regulating the frequency at the cathodes of the tubes 52 and 53. The tubes 52, 53 and 169 form a mixer-modulator circuit 61a of the same kind as the device 61 shown in Figure 5, in which the potentiometers 62 and 63 regulate the depth of modulation and allow the phase to be inverted. The output of the mixer-modulator 61a is the signal 110a which is amplified in the amplifier 42.

The potentiometers 111 and 112 regulate the inputs to the amplifier and de-phasing tubes 113, 116 and 117. The tube 113 is a double triode de-phasing valve the first cathode of which controls the grid of the tube 116 and the second cathode the grid of the tube 117, the first and second plates of the double triode 113 controlling respectively the tubes 118 and 119. The plates of the amplifier tubes 116, 117 and 118, 119 are arranged respectively in the primaries 120 and 121 of the transformers 122 and 123 having a ratio giving an amplification at the secondaries 124 and 125 which is sufficient to ensure symmetrical scanning of the deflection plates 43 and 44 of the kinescope 41, the cathode beam of which is concentrated by the element 41a.

The shape of the scanning spirals 126 opposite the kinescope has been indicated (the two spirals have been shown side by side).

From the valve 169 are taken scanning signals 110a which are sent into the recorder 45 when such a recorder is provided in the receiving station. The recorder 45 also receives the video signals 168 coming from the tube 106a. The recorder 45 comprises an amplifier 130 disposed in front of the recording and reproducing heads 127 and 128. The head 127 serves for the recording and reproduction of the scanning signals 127a and the head 128 serves for the recording and reproduction of the video signals 128a. The recording is effected on the record 129. The video signals 128a and the scanning signals 127a are recorded for example, on a magnetic wire 129 having a low definition. For reproducing the recording with a high definition, the magnetic wire 129 is unwound rapidly, the reproduction being effected by the heads 128 and 127.

Modulators 180 having different frequencies from the scanning frequency can be provided for transmitting tele-control instructions from the receiving apparatus shown in Figure 9 to the emitting apparatus shown in Figure 8. Such tele-control signals are sent to the emitter 144 where they are combined with the scanning signals 144a so as to give complex signals 144b. The signals 144b are emitted from the antenna 145 on the carrier frequency $n_1$. They are received by the antenna 136 of Fig. 8 and it is the whole of the scanning and control signals which is amplified in the amplifier 135 in order to obtain the signal 154a. In the tube 154 the scanning signals 155a are separated from the control signals and the latter are sent through the tube 181 into the selective filters 150 each tuned to an individual sinusoidal frequency of the control modulators 180.

In this way, at the receiving station represented in Figure 9, one can act on the receiver by pressing on the various push buttons 180b of the control modulators 180 so as, for example, to fix its direction in space. The group of modulators 180 has been shown in Figure 7 by the block 180a.

*Two-colour television*

In Figures 10 and 11, a form of construction of a picture-taking equipment and of a two-colour picture receiver have been shown respectively.

To that end, both at the transmitter and at the receiver, two cathode ray tubes (iconoscopes and kinescopes respectively (are used which are put out of action alternately by a switch controlled by triangular signals the rising and falling parts of which correspond in duration to rectangular tops of opposite polarity. The switch therefore alternately interrupts the electron beam from each iconoscope or kinescope by sending a steep fronted rectangular signal alternately to each iconoscope and each kinescope.

Referring first of all to Figure 10 showing the transmitter of two-colour pictures, it will be seen that the colour picture is analysed by two iconoscopes 204 and 204' through an objective 201 by an optical system constituted by a semi-transparent dichroic mirror 202 and by two filters 203 and 203' having complementary colours. The luminous beam having passed through the objective 201 the mirror 202, which is inclined at 45° to the axis of the iconoscopes 204 and 204' and the filter 203, arrives at the iconoscope 204 while the luminous beam which has passed through the objective 201 has been reflected by the mirror 202 and has gone through the filter 203' arrives at the iconoscope 204'.

The iconoscopes 204 and 204' which transform the optical images into electrical signals, are provided in known manner with means 205 and 205' for concentration of the electron beams and with orthogonal deflecting plates or coils 206, 207 and 206', 207'.

The interlaced spiral scanning of the iconoscopes 204 and 204' and the transmission of the image signals (and if appropriate the scanning and/or control signals) are ensured as described above in connection with the two black and white systems, by an equipment shown diagrammatically by the block 208.

The equipment 208 receives alternately on the line A the image signals coming from the iconoscopes 204 and 204', these signals being alternated by means of the electronic switch 209 through the dephasing tube 210 connected as a cathode follower at a particular frequency of repetition which is a function of the signals 211 and 211' obtained from the commutation signal 213.

The degree of illumination is regulated by means of the rheostats 212 and 212'.

In Figure 10 is shown the complete commutation signal 212 comprising a triangular signal 214 (rising portion—215 (falling portion) to which correspond two equal flat-topped steep-fronted waves 216 and 217 of opposite polarities (the curve 216, 217 represents the derivative of the curve 214, 215). Those tops alternately cut out the pictures or, more strictly, the cathode beams of the iconoscopes 204 and 204'. For example, the signal 211 sent to the iconoscope 204 comprises a rising portion 218 shown in full lines corresponding to the transmission of the image received by 204 and a falling portion 219 shown in broken lines corresponding to the cutting out of the iconoscope 204. Similarly, the signal 211' comprises a rising portion 218' shown in broken lines corresponding to the cutting out of the iconoscope 204' and a rising portion 219' shown in full lines corresponding to the transmission of the image received by the iconoscope 204'. In fact, only the steep-fronted tops 220 and 220' shown in full lines corresponding to the parts 218 and 219' shown in full lines of the signals 211 and 211' are transmitted by the tube 210 to the iconoscopes 204 and 204'.

The receiving station shown in Figure 11 comprises an electronic alternating switch 209a analogous to the switch 209 of Fig. 10. The same reference numerals have been given to the signals which are brought into being by that switch and are sent by the dephasing tube 210a connected as a cathode follower to the two kinescopes 221 and 221'.

Those two kinescopes 211 and 211' comprise in the known manner elements 222 and 222' which effect the concentration of the cathode beams and orthogonal coils or plates 223, 224 and 223', 224'.

The interlaced spiral scanning of the kinescopes 221, 221' and the supply of video signals to their wehnelts 225 and 225' are ensured by an equipment 226 which is of a kind described in the case of the black and white television with reference to Figures 4 and 6 or 7 and 9.

The switch 209a through the tube 210a, as explained with reference to Figure 10, alternates the kinescopes 221 and 221' at the same frequency of repetition as that which is used at the transmitting end.

One of the two equipments 208, 226 comprises according as the scanning signal generator is arranged at the transmitter or at the receiver the transitron 48 of Figures 5 or 9; that transitron in the known manner gives rise to the triangular signal 49 from alternate rectangular signals having steep fronts and having a width equal to one half of the width of the triangle 49. The alternate rectangular signals of the transitron are used directly for the production of the rectangular signals 216, 217.

On the other hand, in the transmitting station or in the receiving station where there is no transitron a scanning signal of the type 114a of Figure 9 is received, this signal being emitted from the other station (transmitter or receiver). That signal is detected (the upper or lower half of the signal 144a is attained), it is filtered and it is differentiated in a known manner in a circuit RC so that rectangular signals are obtained which are identical with the rectangular signals emitted directly by the transitron (signals 216, 217). In this way, an automatic synchronisation between the alternation at the transmitter and at the receiver is ensured.

The level at which the electron beam emitted by the cathodes 228 and 228' of the kinescopes 221 and 221' are cut out is adjusted respectively by the rheostats 227 and 227'.

Two-colour vision is effected through an optical system comprising two coloured filters 229, 229' placed respectively before the screens 231 and 231' of the kinescopes 221 and 221' (229 is identical with the filter 203 and 229' with the filter 203') and a semi-transparent dichroic mirror 230 placed at 45° relatively to the axes of the kinescopes 221 and 221'. The eye when placed at 232 sees a two-colour image.

For the transmission of four-colour pictures the same method is used as well as an analogous apparatus comprising four iconoscopes and two selectors (with two pairs of alternating tops) at the transmitter and four kinescopes and two selectors (with two pairs of alternating tops) at the receiver.

*Television in relief*

In Figures 12 and 13 there have been shown respectively a picture-taking apparatus and a receiver for stereoscopic pictures in relief.

To this end, both at the transmitter and at the receiver, two cathode ray tubes (iconoscopes and kinescopes respectively) are used which are alternately cut out by alternating switches of the same kind as those described with reference to the two-colour television, by means of triangular signals the rising portions of which correspond to rectangular tops of opposite polarity to that of the rectangular tops corresponding to the falling portions.

Referring first of all to Figure 12 showing a transmitting station for stereoscopic pictures in relief it can be seen that the station comprises two iconoscopes 304 and 304' in front of which is placed a stereoscopic optical system 302. That system 302 gives two images of the object 300, each of those two images being analysed alternately by one of the iconoscopes 304 and 304'. The alternation of the analyses is controlled by an electronic alternating switch 309 comprising the dephasing tube 310 connected as a cathode follower which receives the signal 313 (identical with the signal 213 of Figures 10 and 11) and sends blocking tops alternately through the rheostats 312 and 312' into the iconoscopes 304 and 304'.

The scanning of those iconoscopes is effected by signals coming from the equipment 308 (analogous to the equipment 208 of Figure 10) these signals being received by the orthogonal plates or coils 306, 307 and 306', 307' of the iconoscopes 304 and 304' respectively. The electrical signals coming from the iconoscopes 304 and 304' arrive through A' into the equipment 308. That equipment emits the image signals and if appropriate the scanning signals, towards the equipment 326 at the receiving station shown in Figure 13. (The equipment 326 is analogous to the equipment 226 of Figure 11.)

The alternating signal is applied to the electronic commutator 309a (signal 313) which through the dephasing tube 310a connected as a cathode follower sends blocking tops alternately through the rheostats 327 and 327' on to the cathodes 328 and 328' of the kinescopes 321 and 321' respectively; the kinescopes 321 and 321' are alternated at a frequency of repetition which is identical with the frequency of repetition of the iconoscopes 304 and 304' by means of the arrangement described in the case of two-colour television. The level at which the electronic beams are cut out is regulated by the rheostats 327 and 327'.

The scanning of the iconoscopes 321 and 321' is effected by the scanning signals coming from 326 and applied to the orthogonal plates or coils 323, 324 and 323', 324'. In front of the screens 331 and 331' of the iconoscopes, there is a stereoscopic optical system 330 through which the pictures can be seen in relief.

For the transmission of images in relief, it is possible, in accordance with a variation, to use instead of the stereoscopic devices 302 and 330 parallax panoramagram grid. In that case, only one iconoscope and only one kinescope need be used and the provision of any electronic alternating device is avoided.

It is to be understood that various changes, improvements or additions can be made in the constructions described and shown here and that certain devices can be replaced by equivalent devices without thereby exceeding the scope of the invention.

For example, the iconoscopes can be replaced by orthicons, image-orthicons, supericonoscopes, eriscopes, vidicons, etc.

I claim:

1. Apparatus for televising, in black and white, intelligence obtained by the spot scanning of a surface comprising means for generating sinusoidal signals, means for modulating said sinusoidal signals and means for emitting the modulated signals as scanning signals; a transmitting station comprising a television camera having electron beam deflecting elements, means for directing said scanning signals onto the electron beam deflecting elements of said camera, and a video signal emitter coupled to said television camera for transmitting video signals in accordance with the scanning signals and the scene viewed by the television camera; and at least one receiving station comprising a kinescope having electron beam deflecting elements, means for directing said scanning signals onto the electron beam deflecting elements of said kinescope and a video signal receiver coupled to said kinescope and responsive to said video signal emitter so that said kinescope reproduces the scene in accordance with the scanning and video signals.

2. Apparatus as claimed in claim 1 in which said means for generating the sinusoidal signals and means for modulating said sinusoidal signals are incorporated in the transmitting station, and in which the transmitter at said station transmits both the video signals and the scanning signals.

3. Apparatus as claimed in claim 1 in which said means for generating the sinusoidal signals and means for modulating said sinusoidal signals are incorporated in the receiving station and in which the transmitting station comprises a receiver which receives the scanning signals emitted by the receiving station.

4. Apparatus as claimed in claim 1 in which the scanning signal generator comprises a transitron which emits a symmetrical signal which first rises and then falls and an oscillator giving rise to a sinusoidal signal, said symmetrical signal and its negative image modulating the sinusoidal signal so as to form the scanning signal.

5. Apparatus as claimed in claim 1 comprising means for forming the scanning signal including means for the amplitude modulation of said sinusoidal signal by a double symmetrical signal and means for dividing said scanning signal into a pair of signals having a relative phase displacement of 90°, each of the signals of said pair being applied to one of the deflecting elements of the television camera and any kinescope.

6. Apparatus for televising intelligence obtained by the scanning of a surface comprising: a transmitting station including a scanning signal generator with a transitron producing a triangular signal and an oscillator producing sinusoidal signals, a modulator modulating said sinusoidal signals by means of said triangular signals and the negative images thereof, a dephasing device for forming from said modulated sinusoidal signals a pair of scanning signals having a relative phase displacement of 90°, an iconoscope comprising two pairs of deflecting elements adapted to receive said pair of scanning signals, a video amplifier, a mixer-modulator for the video signals and the scanning signal leaving said modulator, and a transmitter transmitting together the scanning signals and the video signals; and at least one receiving station comprising a kinescope having electron beam deflecting elements, means for directing said scanning signals onto the electron beam deflecting elements of said kinescope and a video signal receiver coupled to said kinescope.

7. Apparatus for televising intelligence obtained by the scanning of a surface comprising: means for generating sinusoidal signals, means for modulating the sinusoidal signals and means for emitting the modulated sinusoidal signals as scanning signals, a transmitting station comprising a television camera having electron beam deflecting elements, means for directing the scanning signals onto the electron beam deflecting elements of said television camera, and a video signal emitter coupled to said television camera for transmitting video signals in accordance with the scanning of a scene by the television camera; and a receiving station comprising a receiver for the scanning signals and video signals, amplifiers in said receiving for said scanning signals and said video signals, separating means coupled to said amplifiers for separating the video signals from the scanning signals, a dephasing device coupled to said separating means for transforming said scanning signals into a pair of scanning signals having a relative phase displacement of 90°, a kinescope the wehnelt of which is and a kinescope for receiving deflecting elements of which receive said pair of scanning signals and reproducing the scene in accordance with the video and scanning signals.

8. Apparatus for televising intelligence obtained by the scanning of a surface comprising: means for generating sinusoidal signals, means for modulating the sinusoidal signals and means for emitting the modulated sinusoidal signals as scanning signals, a transmitting station comprising a television camera having electron beam deflecting elements, means for directing the scanning signals onto the electron beam deflecting elements of said television camera, and a video signal emitter coupled to said television camera for transmitting video signals in accordance with the scanning of a scene by the television camera; and a receiving station comprising tele-control frequency modulators, a scanning signal generator, means for mixing said scanning and tele-control signals and emitting said signals on a carrier wave, a dephasing system for transforming said scanning signals into a pair of scanning signals having a relative phase displacement of 90°, a receiver for said video signals, an amplifier for said video signals, and a kinescope for receiving the video signals, said kinescope having pairs of deflecting elements which are adapted to receive said pair of phase-displaced scanning signals and reproducing the scene in accordance with the video scanning signals.

9. Apparatus for televising intelligence obtained by the scanning of a surface comprising: means for generating sinusoidal signals, means for modulating the sinusoidal signals and means for emitting the modulated sinusoidal signals as scanning signals; a transmitting station comprising a television camera having electron beam deflecting elements, means for directing the scanning signals onto the electron beam deflecting elements of said television camera, and a video signal emitter coupled to said television camera for transmitting video signals in accordance with the scanning of a scene by the television camera; and a receiving station comprising a kinescope having electron beam deflecting elements, means for directing said scanning signals onto the electron beam deflecting elements of said kinescope, a video signal receiver coupled to said kinescope, a recorder comprising an amplifier, a recording and reproducing head for the video signals, a recording and reproducing head for the scanning signals, a recording element, means for reproducing the recording at a high definition by inspecting said record element with said recording and reproducing heads and means to couple said recording and reproducing heads to said kinescope.

10. Apparatus for televising intelligence obtained by the scanning of a surface comprising: means for generating sinusoidal signals, means for modulating the sinusoidal signals and means for emitting the modulated sinusoidal signals as scanning signals; a receiving station comprising a kinescope having electron beam deflecting elements, means for directing said scanning signals onto the electron beam deflecting elements of said kinescope, a video signal receiver, and means for emitting tele-control signals; and a transmitting station comprising a receiver for the scanning signals and said tele-control signals, means for separating said tele-control signals from said scanning signals, a dephasing device for transforming said scanning signals into a pair of signals having a relative phase displacement of 90°, a television camera, an iconoscope coupled to said television camera, two pairs of electron beam deflecting elements in said iconoscope adapted to receive said pair of scanning signals, a video amplifier, a video emitter and a device for receiving said tele-control signals from said separating device and transforming said signals into tele-control orders.

11. Apparatus such as claimed in claim 6 for televising intelligence in two colors wherein said transmitter comprises two iconoscopes, an optical system associated with said iconoscopes, said iconoscopes receiving through said optical system the complementarily colored images of the surface to be transmitted, and a first electronic alternating device which cuts out the two iconoscopes alternately at a particular frequency of recurrence; and wherein said receiver comprises two kinescopes, and a second electronic alternating device, synchronized with said first alternating device, which cuts out said two kinescopes alternately.

12. Apparatus as claimed in claim 11 in which the axes of the two iconoscopes and the two kinescopes respectively are at right angles to each other and wherein said kinescopes comprise cathode ray tubes, and an optical system at the receiver and the optical system at the transmitter are each constituted by a semi-transparent, dichroic mirror arranged at 45° relatively to the axes of the cathode ray tubes and said iconoscopes and by filters for complementary colours arranged in front of the cathode ray tubes and iconoscopes.

13. Apparatus such as claimed in claim 6 for televising stereoscopically and in relief intelligence which is obtained by the spot scanning of a surface by means of electromagnetic waves or of modulated currents comprising at the transmitter a stereoscopic device, two iconoscopes arranged in parallel behind said stereoscopic device, an electronic alternating device which puts the two iconoscopes alternately out of action at a given frequency of recurrence, and at the receiver two kinescopes arranged in parallel, a stereoscopic viewing device placed in front of the screens of the kinescopes, an electronic alternating device for cutting out said two kinescopes alternately, the transmitting and receiving alternating devices being independent.

14. A television system comprising a scanning generator including means for electronically generating a sinusoidal signal of stable frequency, means for amplitude modulating said sinusoidal signal thereby generating a first amplitude modulated signal and means for transmitting said first modulated signal; a transmitter including an electronic picture pick-up tube with a first and a second pair of elements for deflecting the electron beam in said pick-up tube in two perpendicular directions respectively, means for receiving said first modulated signal, means for deriving therefrom a second amplitude modulated signal also sinusoidal, of same frequency and of same modulation, but phase displaced through 90°, means for applying said first and said second modulated signal to said first and second pair of deflecting elements of said pick-up tube respectively and a video emitting unit for transmitting the video signal generated in said pick-up tube; and at least one receiver including a picture reproducing tube with a third and a fourth pair of elements for deflecting the electron beam in said picture reproducing tube in two perpendicular directions respectively, means for receiving said video signal, means for applying the amplified video signal to the electron source of said picture reproducing tube, means for receiving said first modulated signal, means for deriving therefrom a third amplitude modulated signal also sinusoidal, of same frequency and same modulation but phase displaced through 90° and means for applying said first and said third modulated signal to said third and fourth pair of deflecting elements of said picture reproducing tube respectively.

15. A system as claimed in claim 14 wherein said scanning generator is incorporated in said transmitter which transmits both said video signal and said first modulated signal.

16. A system as claimed in claim 14 wherein said scanning generator is incorporated in said transmitter that transmits said video signal and, in a gap produced in the spectrum thereof, said first modulated signal.

17. A system as claimed in claim 14 wherein said scanning generator is incorporated in a receiver and in which said transmitter receives said first modulated signal from said receiver.

18. A system as claimed in claim 14 wherein said scanning generator comprises a transitron which emits a symmetrical signal which increases and decreases in magnitude, and an oscillator producing a sinusoidal signal, said symmetrical signal modulating the amplitude of said sinusoidal signal so as to form said first modulated signal.

19. A system as claimed in claim 14 wherein a receiver comprises means for electronically forming said first modulated signal by amplitude modulation of said sinusoidal signal by a symmetrical increasing and decreasing signal and for dividing said first modulated signal into a pair of signals having a relative phase displacement of 90°, each of the signals of said pair being applied to one of said pair of deflecting elements of said picture recording tube of said receiver.

20. A system as claimed in claim 14 wherein the transmitter comprises means for electronically forming said first modulated signal by amplitude modulation of said sinusoidal signal by a symmetrical increasing and decreasing signal and for dividing said first modulated signal into a pair of signals having a relative phase displacement of 90°, each of the signals of said pair being applied to one of said pair of deflecting elements of said pick-up tube of said transmitter.

References Cited in the file of this patent

UNITED STATES PATENTS

| | | |
|---|---|---|
| 2,414,453 | France | Jan. 21, 1947 |
| 2,515,613 | Schoenfeld | July 18, 1950 |
| 2,570,775 | De Baun | Oct. 9, 1951 |
| 2,597,743 | Millspaugh | May 20, 1952 |
| 2,655,556 | Abelson | Oct. 13, 1953 |

UNITED STATES PATENT OFFICE

CERTIFICATE OF CORRECTION

Patent No. 2,816,158                                        December 10, 1957

Christian Charles Crovella

It is hereby certified that error appears in the printed specification of the above numbered patent requiring correction and that the said Letters Patent should read as corrected below.

Column 1, line 37, for "of the" read -- by the --; column 3, line 66, for "featuers" read -- features --; column 4, line 63, after "being" insert -- of --; column 8, line 16, for "conrtol" read -- control --; column 9, line 40, for "reproductiong" read -- reproduction --; column 10, line 32, for "transmissions" read -- transmission --; column 11, line 20, for "lamp" read -- cathodyne --; column 12, line 60, for "spectively (are" read -- spectively) are --; line 71, after "201" insert a comma; column 13, line 1, after "204" insert a comma; line 27, for "212" read -- 213 --; column 15, line 16, after "330" insert -- a --; column 16, line 31, after "receiving" insert -- station --; line 36, before "a", second occurrence, insert -- and --; lines 37 and 38, strike out "kinescope the wehnelt of which is and a kinescope for receiving deflecting elements of which receive said pair of" and insert instead -- kinescope for receiving the video signals, said kinescope having deflecting elements which receive said pair of --; lines 39 and 62, for "reproducing", each occurrence, read -- reproduce --.

Signed and sealed this 21st day of October 1958.

(SEAL)
Attest:

KARL H. AXLINE
Attesting Officer

ROBERT C. WATSON
Commissioner of Patents